US011460623B2

(12) United States Patent
Gismondi

(10) Patent No.: US 11,460,623 B2
(45) Date of Patent: Oct. 4, 2022

(54) LED LIGHTING LAMP

(71) Applicant: ARTEMIDE S.p.A., Milan (IT)

(72) Inventor: Ernesto Gismondi, Milan (IT)

(73) Assignee: ARTEMIDE S.p.A.

( * ) Notice: Subject to any disclaimer, the term of this patent is extended or adjusted under 35 U.S.C. 154(b) by 0 days.

(21) Appl. No.: 17/024,951

(22) Filed: Sep. 18, 2020

(65) Prior Publication Data

US 2021/0088709 A1   Mar. 25, 2021

(30) Foreign Application Priority Data

Sep. 20, 2019   (IT) .................. 102019000016877

(51) Int. Cl.
*F21V 8/00*   (2006.01)
*F21V 29/70*   (2015.01)
*F21Y 103/33*   (2016.01)
*F21Y 115/10*   (2016.01)

(52) U.S. Cl.
CPC ............ *G02B 6/0036* (2013.01); *F21V 29/70* (2015.01); *G02B 6/0051* (2013.01); *G02B 6/0088* (2013.01); *F21Y 2103/33* (2016.08); *F21Y 2115/10* (2016.08)

(58) Field of Classification Search
CPC .. G02B 6/0036; G02B 6/0051; G02B 6/0088; F21V 29/70; F21Y 2103/33; F21Y 2115/10
USPC ......................................................... 362/606
See application file for complete search history.

(56) References Cited

U.S. PATENT DOCUMENTS

| 6,480,307 | B1* | 11/2002 | Yang .................... | G02B 5/0215 |
| | | | | 349/65 |
| 2011/0242821 | A1* | 10/2011 | Pan ......................... | F21K 9/23 |
| | | | | 362/345 |
| 2012/0236593 | A1* | 9/2012 | Wei ...................... | G02B 6/0085 |
| | | | | 362/609 |
| 2014/0092580 | A1 | 4/2014 | Mccollum et al. | |
| 2015/0338048 | A1* | 11/2015 | Ahn ..................... | G02B 6/0068 |
| | | | | 362/511 |
| 2015/0355405 | A1* | 12/2015 | Gentile .................. | G09F 13/02 |
| | | | | 362/611 |

(Continued)

FOREIGN PATENT DOCUMENTS

| JP | 6064197 B2 | 1/2017 |
| KR | 101491009 B1 | 2/2015 |

OTHER PUBLICATIONS

Italian Search Report and Written Opinion issued by Ministero dello Sviluppo Economico for Italian Application No. 201900016877, dated Mar. 25, 2020, pp. 1-7.

*Primary Examiner* — Andrew J Coughlin
*Assistant Examiner* — Jessica M Apenteng
(74) *Attorney, Agent, or Firm* — The Belles Group, P.C.

(57) ABSTRACT

An LED lighting lamp comprises an essentially annular perimetric frame positioned about an axis; a plurality of LEDs arranged along a radially inner perimetric edge of the frame and angularly spaced apart from one another about the axis; and a substantially flat and completely transparent light-guide plate, having two opposite faces substantially perpendicular to the axis and a radially outer perimetric edge facing the LEDs; at least one face of the light-guide plate is provided with an engraving pattern, formed by a plurality of notches shaped so as to extract light from the light-guide plate through said at least one face.

17 Claims, 3 Drawing Sheets

(56) References Cited

U.S. PATENT DOCUMENTS

2017/0219760 A1* 8/2017 Aydin ................. G02B 6/0031
2017/0242182 A1   8/2017 Diana et al.
2018/0128434 A1   5/2018 Moon et al.
2018/0195683 A1* 7/2018 Sonneman ................ F21V 5/04

* cited by examiner

LED LIGHTING LAMP

CROSS-REFERENCE TO RELATED APPLICATIONS

This patent application claims priority from Italian patent application no. 102019000016877 filed on Sep. 20, 2019, the entire disclosure of which is incorporated herein by reference.

TECHNICAL FIELD

This invention relates to an LED lighting lamp, (lighting equipment used as a means of lighting environments or spaces whether indoor or outdoor).

BACKGROUND ART

Although LED lighting equipment is becoming increasingly popular, there are still some drawbacks, mainly related to the characteristics of LED light sources.

In particular, due to the essentially point-like nature of LEDs, there are drawbacks in terms of the width and homogeneity of the lighting. In order to achieve homogeneous lighting effects and large illuminating surfaces, it is normally necessary to use complex optical systems in combination with LEDs.

The use of complex optical systems also leads, at least in certain configurations, to relatively large overall dimensions, which also limit designers' freedom in creating lamps with original and attractive shapes.

On the other hand, the lighting sector is constantly searching for technical solutions, which also allow the integration of aesthetically original objects, besides obtaining new concept lighting effects, since it's not only the purely functional aspect that is fundamental in this sector, but also the aesthetic and emotive components.

DISCLOSURE OF INVENTION

One purpose of this invention is to provide an LED lighting lamp that overcomes the highlighted drawbacks of the prior art; in particular, one purpose of this invention is to provide a lamp that, while using LED light sources, provides a large and homogeneous illuminating surface, while also being particularly easy to produce.

An additional purpose of the invention is to provide an LED lamp that is able to provide an original lighting effect, while also being able to take on an aesthetically original form.

Thus, this invention relates to an LED lighting lamp as defined in the appended claim 1 and, in terms of its preferred features, in the dependent claims.

In the lamp of the invention, the light emitted by a plurality of LEDs is laterally emitted into a light-guide plate (LGP) through the perimeter edge thereof and is extracted from the faces of the light-guide plate by an engraving pattern arranged on one of the faces. The extraction takes place due to the surface irregularity formed on the light-guide plate that no longer retains the light rays inside by total internal reflection, because the rays no longer impact on the air-material discontinuity above the critical angle with respect to the normal.

The engraving pattern has specifically selected characteristics to obtain a uniform light extraction over the entire surface of the light-guide plate and thus generate a perception of uniformity of illuminance in observers.

The engraving pattern is selected, in particular, according to at least some of the following parameters:
- distance between the LED sources along the perimeter edge of the light-guide plate;
- thickness of the light-guide plate;
- geometric shape of the light-guide plate;
- function that governs the distribution of the extraction points;
- depth of the notches;
- optical-physical constants of volumetric scattering of the light-guide plate material;
- other optical constants of the light-guide plate material (refractive index, Abbe number, absorption constant, etc.).

The engraving pattern is constructed by setting:
- constant point extraction in terms of lux (lumen/m^2);
- Lambertian emission in extraction;
- percentage of flux extracted on each face.

In particular, a constant point extraction from all points of the engraving pattern (i.e. from all the engravings in the pattern) and a Lambertian extraction emission determine a perception of constant luminance extended over the entire surface of the light-guide plate, so that a uniform visual impression is perceived regardless of the viewing angles and the point observed on the light-guide plate.

In this way, the light-guide plate is transparent when the lamp is switched off, while it evenly lights when the lamp is on.

When switched on, the lamp provides a uniform light, perfectly suited to working environments and able to comply with UGR standards in any installation position.

BRIEF DESCRIPTION OF THE DRAWINGS

The invention will now be described in detail in the following non-limiting embodiments, with reference to the figures in the accompanying drawings in which.

BEST MODE FOR CARRYING OUT THE INVENTION

Figure 1:
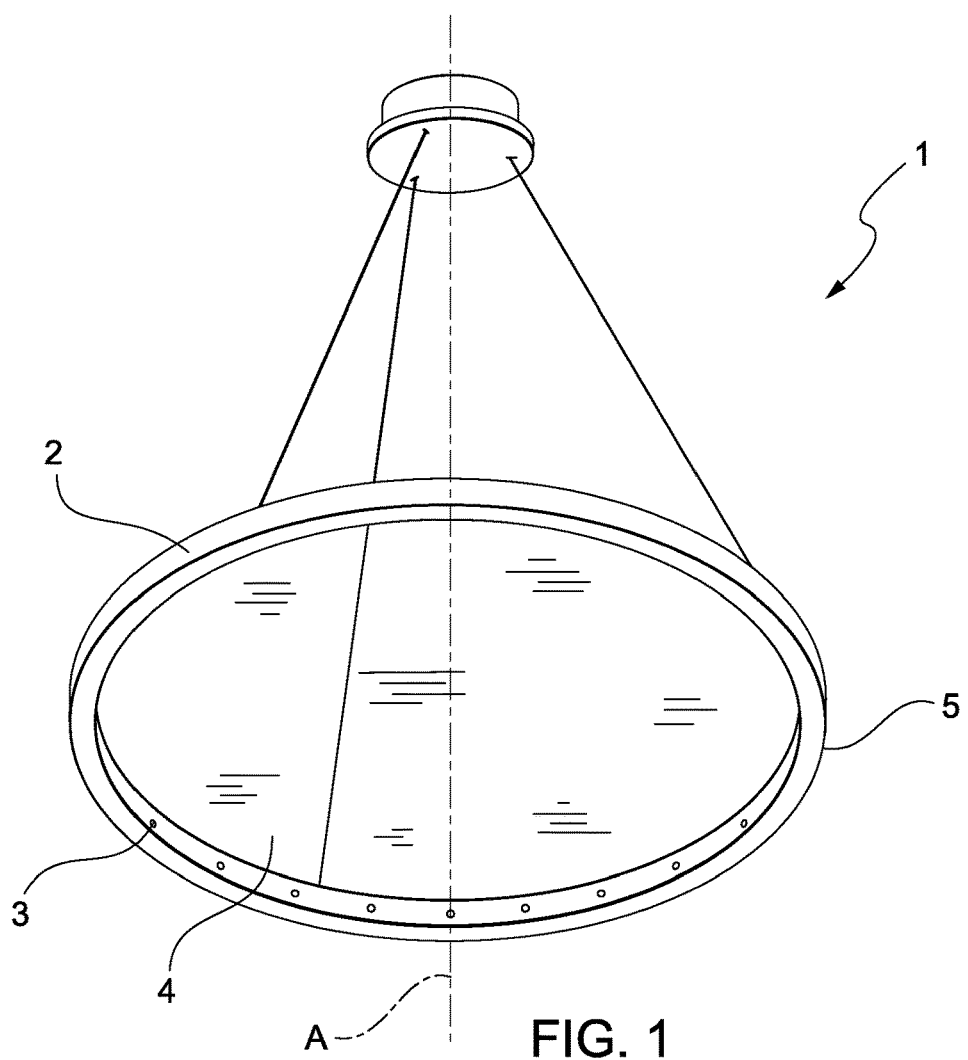
FIG. 1 is a schematic perspective view of an LED lighting lamp according to the invention.
Figure 2:
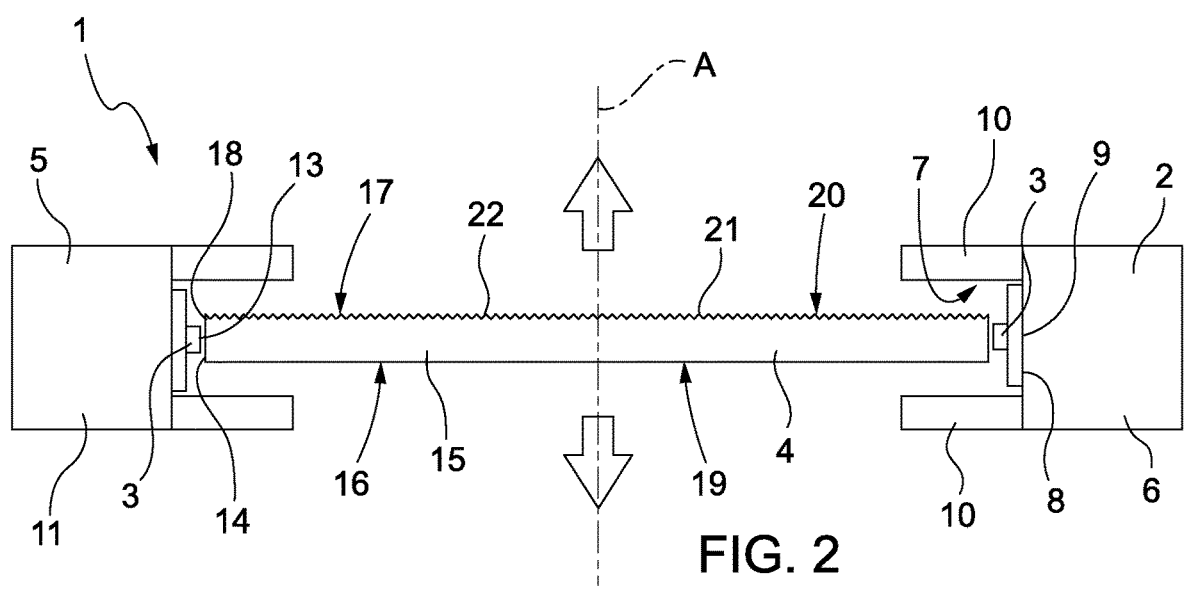
FIG. 2 is a sectioned schematic view of the lamp in FIG. 1, of which only the main components are shown.

In FIGS. 1 and 2, a LED lighting lamp, which extends substantially about an axis A and comprises a support structure 2 that supports a plurality of LEDs 3 and a light-guide plate 4, is indicated as a whole with the reference number 1.

In the non-limiting example illustrated, the lamp 1 is a hanging lamp and the support structure 2 is configured to fix the lamp 1 to a ceiling.

It is understood that the lamp 1 can be of different types (wall lamp, recessed lamp, table lamp, floor lamp, etc.) and have a support structure 2 shaped in another way. The lamp 1 can also assume the shape of a different furnishing component, for example a partitioning panel, a door, a work surface, etc., while always keeping the lighting function typical of a lamp when switched on and a complete transparency when switched off.

The support structure comprises an essentially annular perimetric frame 5 arranged about the axis A. In the non-limiting example illustrated, the frame 5 is shaped like an essentially circular ring, but the frame 5 can have other shapes (for example, it can be basically elliptical, square, or rectangular, or otherwise polygonal, possibly with rounded edges etc.).

In particular, the frame 5 has an annular body 6 that extends about the axis A and is provided with a radially inner hollow seat 7 that has an substantially C-shaped cross section facing the axis A. The seat 7 has a bottom wall 8, defining a radially inner perimetric edge 9 of the frame 5; and two lateral walls 10 facing each other and that protrude radially from the bottom wall 8.

The body 6 houses wires and components for feeding and controlling the LEDs (known and not illustrated for simplicity); the body 6 also performs the function of heat dissipation for the LEDs, being provided with at least one heat dissipation portion 11 to this end, which is made of a heat-conductive material (for example, a metal material) and connected to the LEDs 3 to remove heat from the LEDs 3. In particular, the portion 11 radially protrudes towards the outside of the bottom wall 8.

The seat 7 houses the LEDs 3, which are arranged on the bottom wall 8 of the seat 7, i.e. on the radially inner perimetric edge 9 of the frame 5.

Advantageously, the LEDs 3 are entirely housed in the seat 7, i.e. the LEDs 3 do not protrude radially, nor axially, beyond the seat 7. For this purpose, the lateral walls 10 of the seat 7 extend beyond the LEDs 3 (so as to mask the LEDs 3 in the axial direction, i.e. parallel to the axis A).

The LEDs 3 are angularly spaced apart, preferably regularly spaced apart, one from the other along the radially inner perimetric edge 9 of the frame 5 and around the axis A. The LEDs 3 direct respective emission surfaces 13 towards the light-guide plate 4 and, precisely, towards a radially outer perimetric edge 14 of the light-guide plate 4.

The LEDs 3 can be of various kinds and have curved or, as shown in FIG. 2, substantially flat emission surfaces 13.

The light-guide plate 4 is supported by the frame 5 and arranged around the axis A with the radially outer perimetric edge 14 facing the radially inner perimetric edge 9 of the frame 5 (i.e. facing the bottom wall 8 of the seat 7) and the LEDs 3.

The light-guide plate 4 has a monolithic body 15 made of a transparent material, for example a glass or polymer material (for example, PMMA). In the non-limiting example illustrated, the body 15 is a body of rotational symmetry about the axis A and the light-guide plate 4 has a basically circular plan shape, being shaped like a flat circular disk (though it is understood that the light-guide plate 4 can also have different shapes, as already indicated for the frame 5, for example quadrangular or, in general, polygonal).

The light-guide plate 4 has a pair of opposite faces 16, 17 that are substantially plane and parallel to each other and perpendicular to the axis A, and a lateral surface 18 that joins the faces 16, 17 and defines the radially outer perimetric edge 14 of the light-guide plate 4.

In the example of FIG. 1, since the lamp 1 is a hanging lamp, the face 16 is a direct emission face, which constitutes a front surface 19 of the lamp 1 intended, in use, for facing directly towards the users and the environment and the objects to light. In contrast, the opposite face 17 is an indirect emission face that constitutes a rear surface 20, facing, in use, towards the opposite side to the users and the environment and the objects to light, of the lamp 1. However, it is understood that the lamp 1 can be employed in different ways and that the faces 16, 17 can be, thus, oriented differently in relation to the environment to light.

The face 16 is a smooth face, while the opposite face 17 is provided with an engraving pattern 21 formed by a plurality of notches 22 shaped so as to extract the light from the light-guide plate 4 through the face 17.

Figure 3:
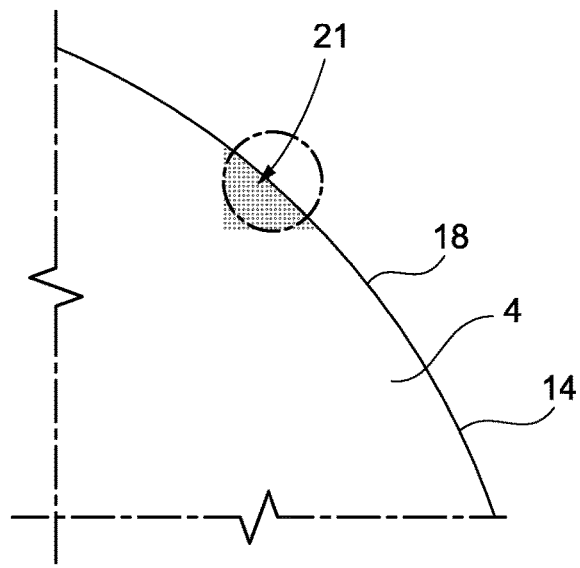
FIG. 3 is a schematic plan view of a detail of a lamp component in FIG. 1, in particular a detail of a light-guide plate.
Figure 4:
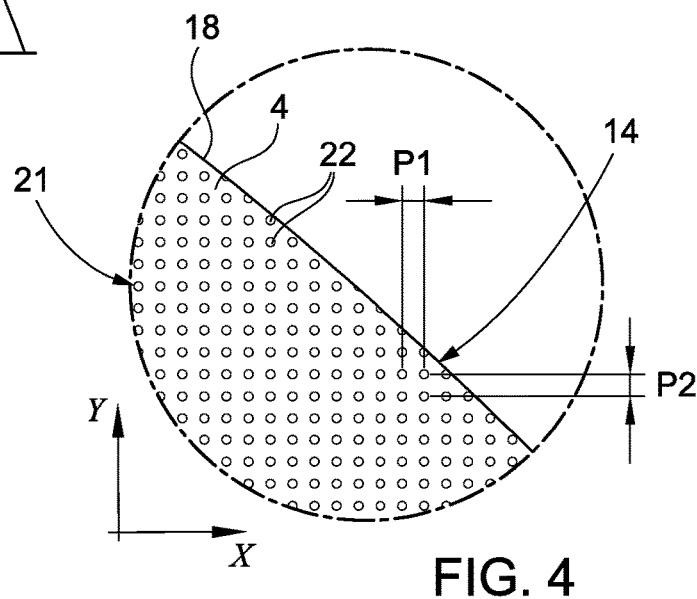
FIG. 4 is an enlarged scale view of the detail highlighted in FIG. 3.

With reference to FIGS. 3 and 4 as well, the notches 22 (shown not to scale and greatly enlarged in FIGS. 2-4) are formed on the light-guide plate 4 beginning with the face 17 and define respective surface discontinuities in the material of the light-guide plate 4, in particular in the material/air interface.

The notches 22 can be variously shaped, sized, and distributed. In general, the notches 22 have dimensions that cannot be perceived with the naked eye (at least at the normal distance at which the lamp 1 is, in use, arranged in relation to observers) and are spaced apart from each other to form the pattern 21.

In particular, the notches 22 are substantially point-shaped and have a circular shape on the face 17.

For example, the notches 22 have the shape of spherical caps, for example basically hemispherical, i.e. they have a surface that is a portion of the spherical surface. It is, however, understood that the shape of the notches 22 can be different, possibly depending on the technology with which the notches are made.

For example, the notches 22 are laser engraved notches, obtained, that is, via laser engraving techniques.

For example, the notches 22 have a depth (measured along the thickness of the light-guide plate 4, i.e. perpendicularly to the face 17) and width (diameter or maximum transverse dimension, i.e. parallel to the face 17) no greater than 0.5 mm.

The light-guide plate 4 preferably has a ratio of thickness (measured perpendicular to the faces 16, 17 opposite the light-guide plate 4) to diameter of the equivalent circular surface (diameter of the circle of equal area, having the same area as the light guide plate 4) no less than 1:500 and no greater than 1:100.

For higher ratios, the so-called "edge conditions" may become relevant, with the result that the optimal distribution of the notches 22, to have uniform visual perception, no longer depends only (or predominantly) on the geometry of the light-guide plate 4, its physical parameters, and the geometry of the notches 22, but on the contour parameters that may be different, as necessary.

For ratios below the minimum indicated limit, in addition to construction complications (especially for large diameters, over 2000 mm), there may be unsatisfactory light transmission inside the light-guide plate 4, in particular due to the difficulty of compensating over long distances for the polymer absorption coefficient with which the light-guide plate 4 is made.

In the case of Lambertian or approximately Lambertian emission on both sides of the light-guide plate 4, and an approximately equal amount of flux emitted on both sides of the light-guide plate 4, the perceived luminance is constant with the observation with a value equal to:

$$F/2 \cdot \pi \cdot S$$

where F is the emitted flux and S is the surface area of the light-guide plate 4.

In general, there is a ratio between emitted flux and surface of the light-guide plate no greater than 10,000 lumen/m$^2$; and, as a result, a luminance no greater than 1600 Cd/m$^2$.

The luminance preferably ranges between 800 and 1600 Cd/m$^2$, more preferably between 900 and 1200 Cd/m$^2$, for example around 1000 Cd/m$^2$.

It should be noted that the luminance values of the lamp 1 in accordance with the invention are, in an absolute sense, very modest if reference is made to more common lighting applications where more visual comfort is required. As a result, compared to the majority of other equipment, it is also simple to effectively control dazzlement according to the current regulations (UGR).

The depth of the notches 22 is less than their width, being, for example, equal to approximately half (or less) of the width.

In particular, the notches 22 have a width that is less than or equal to 0.5 mm, preferably ranging between 0.05 and 0.20 mm, more preferably ranging between 0.10 and 0.15 mm; and have a depth that is less than or equal to 0.25 mm, preferably ranging between 0.01 and 0.10 mm, more preferably ranging between 0.05 and 0.075.

In the preferred embodiment, wherein the notches 22 are shaped like spherical caps, being defined, in particular, by respective surface melting points generated by means of lasers, the notches 22 have a diameter of no more than 0.5 mm, preferably ranging between 0.05 and 0.20 mm, more preferably ranging between 0.10 and 0.15 mm; and a depth that is less than the diameter.

The notches 22 are all equal to one another and are uniformly distributed on the face 17 according to the pattern 21 that is a regular and homogeneous pattern. In particular, the notches 22 have the same distribution on the face 17 along two axes X, Y perpendicular to each other and to the axis A.

For example, the notches 22 are organised in the pattern 21 with a pitch (distance between two successive notches 22) constant and equal along the axes X, Y (i.e. the notches 22 alternate along the axes X, Y with equal pitches P1, P2).

In the non-limiting example illustrated, but not necessarily, the notches 22 are arranged in a square pattern, in rows and columns orthogonal to each other.

The pitch, for example, ranges between 1.00 and 2.00 mm.

The notches 22 and the engraving pattern 21, as a whole, are specifically selected so as to obtain a uniform light extraction over the entire face 17 of the light-guide plate 4 and thus generate a perception of uniformity of illumination in observers.

In particular, the parameters of the notches 22 and of the pattern 21 are identified with an algorithm according to:
the distance between the LEDs 3 along the perimeter edge 14 of the light-guide plate 4;
the thickness of the light-guide plate 4;
the geometric shape of the light-guide plate 4;
the function that governs the distribution of the notches 22, i.e. of the extraction points;
the depth of the notches 22;
the optical-physical constants of volumetric scattering of the light-guide plate 4 material;
other optical constants of the light-guide plate 4 material (refractive index, Abbe number, absorption constant, etc.).

In accordance with the invention, the engraving pattern 21 is constructed by requiring that, in particular, it has a constant point extraction in terms of lux (lumen/m$^2$) across the whole face 17 and, at the same time, a Lambertian emission in extraction from the face 17.

It should be noted that, in accordance with the invention, the engraving pattern 21 generates a light extraction with Lambertian configurations on both the faces 16, 17 opposite the light-guide plate 4: each notch 22 sends light rays towards the outside of the light-guide plate 4 on both the faces 16, 17 of the light-guide plate 4.

In other words, the engraving pattern 21 is such that (when the LEDs 3 are switched on) the light emitted by the LEDs 3 is extracted from the light-guide plate 4 through both the faces 16, 17 opposite the light-guide plate 4 with illumination (expressed in lux) that is constant point by point on each face 16, 17 and with an emission of the Lambertian type (Lambertian diffusion: the light hitting from one direction is reflected equally in all directions).

The radially outer perimetric edge 14 of the light-guide plate 4 is basically cylindrical around the axis A and substantially parallel to the axis A and is, for example, substantially smooth. The radially outer perimetric edge 14 is equipped with the lateral surface 18, which is, in turn, basically cylindrical and smooth and faces the radially inner perimetric edge 9 of the frame 5.

The radially outer perimetric edge 14 of the light-guide plate 4 is housed inside the seat 7 and faces the radially inner perimetric edge 9 of the frame 5 and the LEDs 3, which radially surround the outside of the light-guide plate 4.

In use, the LEDs 3 emit light from the respective emission surfaces 13 on the radially outer perimetric edge 14 of the light-guide plate 4; the light emitted by the LEDs 3 thus radially enters the light-guide plate 4 through the radially outer perimetric edge 14 and, precisely, through the lateral surface 18.

The light spreads rad ally in the light-guide plate 4 and is extracted from the light-guide plate, through the face 16 and/or the opposite face 17, via the engraving pattern 21.

The notches 22 are shaped so as to divert via reflection, towards one or both of the faces 16, 17 and, thus, in the direction substantially axial (parallel to the axis A), substantially all the light that passes through the light-guide plate 4.

In the configuration of FIG. 2, the lamp 1 emits light from both the faces 16, 17 of the light-guide plate 4.

In particular, the light entering the light-guide plate 4, through the lateral surface 18 spreads inside the light-guide plate 4, undergoing multiple internal reflections inside the light-guide plate 4 and on the surfaces of the notches 22; the notches 22 are shaped so as to divert then substantially all the light hitting in the axial direction (parallel to the axis A); the light is, thus, emitted through the face 16, i.e. through the front surface 19 of the lamp 1, and/or through the face 17, i.e. through the rear surface 20 of the lamp 1.

With the lamp 1 switched off (LEDs 3 off), since the body 15 of the light-guide plate 4 is completely transparent, the effected provided by the lamp 1 is that of a transparent body. The presence of the engraving pattern 21 does not substantially alter the fully transparent aspect of the body 15, since the notches 22 have dimensions that cannot be perceived by the naked eye under normal conditions of use.

With the lamp 1 switched on (LEDs 3 on), the lamp 1 has an illuminating surface, consisting of the front surface 19, uniformly illuminated with elevated homogeneity and intensity. The effect of the lamp 1 being switched on thus, that of a uniformly illuminated homogeneous surface, surrounded by an element (in this case, the frame 5) that is dark and not illuminated (opaque).

Figure 5:
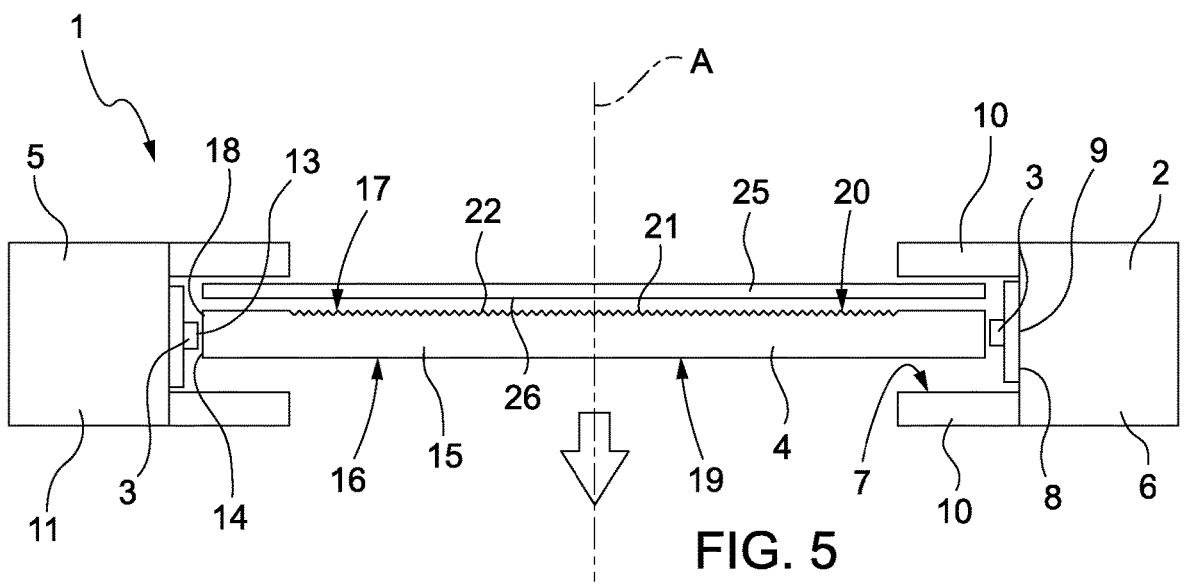
FIGS. 5, 6, and 7 are schematic cross section views of respective variants of the lamp of the invention.
Figure 6:
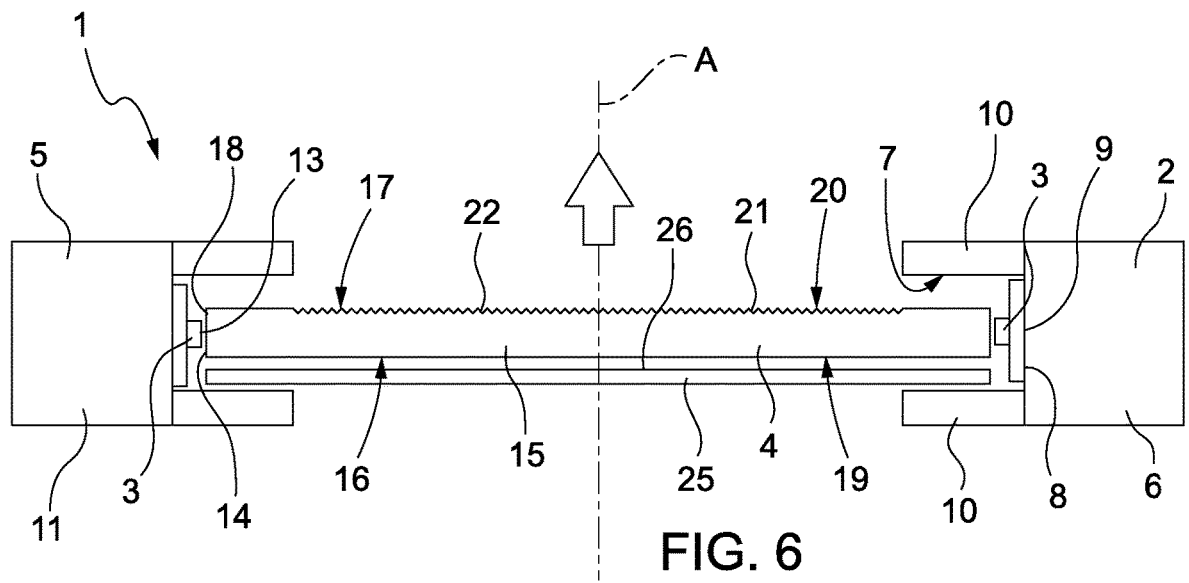

In the variants in FIGS. 5 and 6, in which details similar or equal to those already described are indicated with the same numbers, the lamp 1 comprises a diffusing shield 25 facing the face 16 or the opposite face 17 of the light-guide plate 4.

In particular, the shield 25 has a diffusion surface 26 directly facing the light-guide plate 4 (precisely, the face 16 or the opposite face 17 of the light-guide plate), which is made of a diffusing material, so as to diffuse the light emitted by the face 16 or the opposite face 17 and make the emission of the lamp 1 even more homogeneous through the opposite face.

For example, the diffusing shield 25 or at least its diffusing surface 26 are made of a polymer material that has elevated diffused reflectance of the light (indicatively, greater than 90-95%).

In the embodiment in FIG. 5, the diffusing shield 25 is arranged in front of the face 17, i.e. the rear surface 20 of the lamp 1. The lamp 1 is configured to emit light only directly, i.e. only from the front surface 19 (face 16).

In the embodiment in FIG. 6, in contrast, the diffusing shield 25 is arranged in front of the face 16, i.e. the front surface 19 of the lamp 1. The lamp 1 is configured so emit light only indirectly, i.e. only from the rear surface 20 (face 17).

Figure 7:
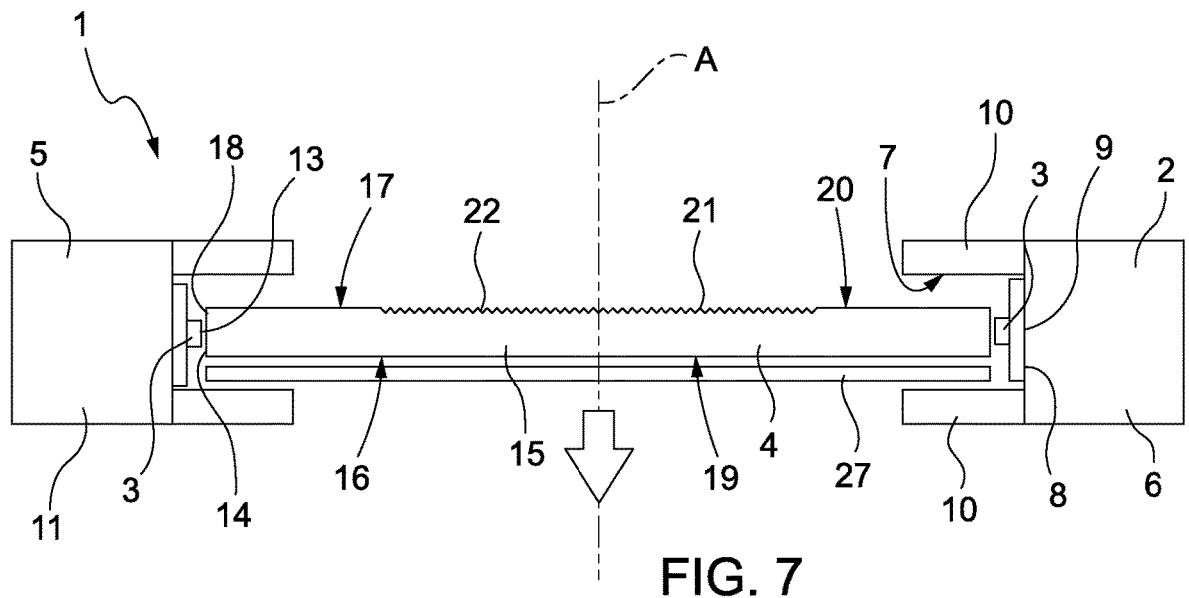

In the further variant shown in FIG. 7, in which the details that are similar or equal to those already described are indicated with the same numbers, the lamp 1 comprises a holographic layer 27 for luminance control.

The holographic layer 27 can be positioned in front of the light-guide plate 4, in particular the face 16; or be made directly on the light-guide plate, in particular on the face 16.

The holographic layer 27 is configured so as to modify the luminance of the lamp 1, complying with the required standards for working environments with video terminals.

It is finally understood that the LED lighting lamp described and illustrated herein may be subject to modifications and variations without departing from the scope of the appended claims.

The invention claimed is:

1. An LED lighting lamp comprising:
   an annular perimetric frame positioned about an axis (A);
   a plurality of LEDs arranged along a radially inner perimetric edge of the frame and angularly spaced apart from one another about the axis (A); and
   a substantially flat and completely transparent light-guide plate comprising a first face and a second face each substantially perpendicular to the axis (A) and a radially outer perimetric edge facing the LEDs;
   wherein the first face is provided with an engraving pattern formed by a plurality of notches shaped so as to extract light from the light-guide plate through said at least one face, the notches protruding away from the second face;
   wherein the notches are shaped and distributed so that with the LEDs switched on the light-guide plate is uniformly and homogenously lighted and with the LEDs turned off the light-guide plate is completely transparent;
   wherein the notches are point-shaped and are shaped like spherical caps and have a diameter of no more than 0.5 mm and a depth that is less than the diameter, so as to divert by reflection in a substantially axial direction parallel to the axis, towards both said opposite faces, the light entering radially in the light-guide plate through the radially outer perimetric edge;
   the notches being shaped so as to generate a light extraction with Lambertian configurations on both the opposite faces of the light-guide plate and to send light rays towards the outside of the light-guide plate on both the opposite faces of the light-guide plate;
   and wherein the light-guide plate has a ratio between thickness, measured perpendicular to the opposite faces of the light-guide plate, and diameter of the equivalent circular surface, defined as the diameter of a circle having the same area as the light guide plate, no less than 1:500 and no greater than 1:100.

2. The lamp according to claim 1, wherein the diameter ranges between at least one of: 0.05 and 0.20 mm, or between 0.10 and 0.15 mm.

3. The lamp according to claim 1, wherein the notches are laser engraved notches defined by respective points of surface melting generated by laser engraving.

4. The lamp according to claim 1, wherein the LEDs are arranged about the radially outer perimetric edge of the light-guide plate and have respective emission surfaces facing the radially outer perimetric edge of the light-guide plate.

5. The lamp according to claim 1, wherein the first and second faces of the light-guide plate are substantially plane and parallel to each other and the radially outer perimetric edge is orthogonal to the faces.

6. The lamp according to claim 1, wherein the frame has an annular body extending about the axis (A) and is provided with a radially inner hollow seat having a substantially C-shaped cross section facing toward the axis (A); the seat having a bottom wall, defining the radially inner perimetric edge of the frame and on which the LEDs are positioned; and two lateral walls facing each other and projecting radially from the bottom wall beyond the LEDs.

7. The lamp according to claim 1, wherein the frame is provided with at least one heat dissipation portion, made of a heat-conductive material and joined to the LEDs to remove heat from the LEDs.

8. The lamp according to claim 1, comprising a diffusing shield facing one of the faces of the light-guide plate.

9. The lamp according to claim 1, comprising a holographic layer for luminance control, arranged in front of one of the faces of the light-guide plate, or made directly on one face of the light-guide plate.

10. The lamp according to claim 1, wherein the notches have a depth and width no greater than 0.5 mm.

11. The lamp according to claim 1, wherein a depth of the notches is less than a width thereof.

12. The lamp according to claim 1, wherein the notches have a width less than or equal to 0.5 mm, preferably ranging between 0.05 and 0.20 mm, more preferably ranging between 0.10 and 0.15 mm; and a depth less than or equal to 0.25 mm, preferably ranging between 0.01 and 0.10 mm, more preferably ranging between 0.05 and 0.075.

13. The lamp according to claim 1, wherein the notches are arranged in the engraving pattern with a constant pitch, the same along a pair of axes (X, Y) perpendicular to each other and to the axis (A) of the light-guide plate.

14. The lamp according to claim 13, wherein the pitch ranges between 1.00 and 2.00 mm.

15. The lamp according to claim 1, wherein the notches and the engraving pattern are selected so as to produce a uniform light extraction from the second face of the light-guide plate and hence produce a perception of uniformity of illumination; and by imposing a constant point extraction, measured in term of lux, on the entire second face and also a Lambertian emission extracted from the second face.

16. The lamp according to claim 1, comprising a luminance ranging between 900 and 1200 $Cd/m^2$.

17. An LED lighting lamp comprising:

an annular perimetric frame positioned about an axis (A);

a plurality of LEDs arranged along a radially inner perimetric edge of the frame and angularly spaced apart from one another about the axis (A); and a substantially flat and completely transparent light-guide plate, comprising a first face and a second face each substantially perpendicular to the axis (A) and a radially outer perimetric edge facing the LEDs;

wherein the first face is provided with an engraving pattern formed by a plurality of notches shaped so as to extract light from the light-guide plate through said at least one face;

wherein the frame has an annular body extending about the axis (A) and is provided with a radially inner hollow seat having a substantially C-shaped cross section facing toward the axis (A), the seat comprising a bottom wall and two lateral walls facing each other, the LEDs not protruding beyond the two lateral walls of the seat;

wherein the notches are shaped and distributed so that with the LEDs switched on the light-guide plate is uniformly and homogenously lighted and with the LEDs turned off the light-guide plate is completely transparent;

wherein the notches are point-shaped and are shaped like spherical caps and have a diameter of no more than 0.5 mm and a depth that is less than the diameter, so as to divert by reflection in a substantially axial direction parallel to the axis, towards both said opposite faces, the light entering radially in the light-guide plate through the radially outer perimetric edge;

the notches being shaped so as to generate a light extraction with Lambertian configurations on both the opposite faces of the light-guide plate and to send light rays towards the outside of the light-guide plate on both the opposite faces of the light-guide plate;

and wherein the light-guide plate has a ratio between thickness, measured perpendicular to the opposite faces of the light-guide plate, and diameter of the equivalent circular surface, defined as the diameter of a circle having the same area as the light guide plate, no less than 1:500 and no greater than 1:100.

\* \* \* \* \*